United States Patent
Wen et al.

(10) Patent No.: US 7,236,258 B2
(45) Date of Patent: Jun. 26, 2007

(54) PERSONALIZED PHOTO GREETING CARDS

(75) Inventors: Xin Wen, Palo Alto, CA (US); David Allen Jared, Denver, CO (US); Dhiraj Kacker, Burlingame, CA (US)

(73) Assignee: Shutterfly, Inc., Redwood City, CA (US)

( * ) Notice: Subject to any disclaimer, the term of this patent is extended or adjusted under 35 U.S.C. 154(b) by 896 days.

(21) Appl. No.: 10/185,862

(22) Filed: Jun. 28, 2002

(65) Prior Publication Data

US 2004/0001219 A1    Jan. 1, 2004

(51) Int. Cl.
*G06F 15/00* (2006.01)

(52) U.S. Cl. .................. 358/1.12; 358/1.13; 358/1.14; 358/1.15; 358/1.16; 358/1.17; 358/1.18; 705/27; 705/26; 700/232; 355/40; 155/248; 101/426

(58) Field of Classification Search ................. 705/27, 705/26; 358/1.13–1.18; 700/232; 355/40; 156/248; 101/426
See application file for complete search history.

(56) References Cited

U.S. PATENT DOCUMENTS

| | | | |
|---|---|---|---|
| 4,590,859 A * | 5/1986 | Pou et al. ................... 101/484 |
| 5,000,815 A * | 3/1991 | Hanna ........................ 156/542 |
| 5,748,484 A * | 5/1998 | Cannon et al. ............. 700/233 |
| 5,749,473 A * | 5/1998 | Yamashita .................. 209/584 |
| 5,761,558 A * | 6/1998 | Patton ........................ 396/429 |
| 6,092,054 A * | 7/2000 | Tackbary et al. ............. 705/27 |
| 6,157,436 A * | 12/2000 | Cok ............................ 355/40 |
| 6,227,531 B1 * | 5/2001 | Guerrero et al. ......... 270/58.31 |
| 6,657,702 B1 * | 12/2003 | Chui et al. .................... 355/40 |
| 6,837,955 B1 * | 1/2005 | McCarthy et al. .......... 156/248 |
| 6,915,273 B1 * | 7/2005 | Parulski ....................... 705/26 |
| 2003/0083890 A1 * | 5/2003 | Duncan ........................ 705/1 |
| 2003/0112462 A1 * | 6/2003 | Ochiai ....................... 358/1.15 |

* cited by examiner

*Primary Examiner*—Twyler Lamb
*Assistant Examiner*—Robert N. Kang
(74) *Attorney, Agent, or Firm*—Xin Wen (57) ABSTRACT

A method for producing personalized greeting cards includes receiving a plurality of greeting card orders from users and separating the ordered greeting cards into batches. The ordered greeting cards are produced in batches and a batch-separation symbol is printed on at least one greeting card in each batch. The greeting cards produced are separated into batches using the batch-separation symbols.

7 Claims, 7 Drawing Sheets

PERSONALIZED PHOTO GREETING CARDS

The present invention is related to commonly assigned U.S. patent application Ser. No. 09/436,704, filed on Nov. 9, 1999, titled "Distributing Images to Multiple Recipients", by Baum, U.S. patent application Ser. No. 09/450,075, filed on Oct. 27, 1999, titled "Printing Images in an Optimized Manner", by Baum, et al., U.S. patent application Ser. No. 09/428,871 filed Oct. 27, 1999, titled "Multi-Tier Data Storage System", U.S. patent application Ser. No. 10/106,902, filed on Mar. 25, 2002, titled "Producing and sharing personalized photo calendars", by Weitzman et al., U.S. patent application Ser. No. 09/721,484, filed on Nov. 22, 2000, titled "User Interface and Methods for On-line Print Service", by Manolis, et al., U.S. patent application Ser. No. 09/450,804, filed on Nov. 29, 1999, titled "Image Uploading", by Manolis, et al., U.S. patent application Ser. No. 09/560,609, filed on Apr. 28, 2000, titled "System and Method of Providing a User Interface for Changing Attributes of an Image-based Product", by Haeberli, and U.S. patent application Ser. No. 09/684,595, filed on Oct. 5, 2000, titled "Previewing a framed image print", by Haeberli. The disclosures of these related applications are incorporated herein by reference.

TECHNICAL FIELD

This application relates to producing and distributing personalized photo greeting cards.

BACKGROUND

Greeting cards are typically printed with static designs and in large quantities. They can commonly be purchased at card stores such as Hallmark, bookstores and other retail locations. After a user purchases the greeting cards, she can handwrite personalized information on the greeting cards and mail them to family members, friends, or business clients. Card printing vending machines have been developed to allow the card purchasers to select the card designs and input their own personalized messages before the actual cards are printed.

In recent years, online photo services such as Shutterfly, Inc., based at Redwood City, Calif., have established services for users to upload, store and share their digital photo images. The users can order physical photo products such as photographic prints, photo books, CD's, etc. The print orders are fulfilled using automated digital printers, and shipped to the recipients as specified by the user. As the photo products are continuous produced, the products need to be separated in batches so that the correct group of products can be shipped to the intended recipients.

U.S. Pat. No. 4,124,290 disclosed a system for interfacing an automatic processing machine with a stack of documents. In the disclosed system, "a stack of documents is transported one-at-a-time, under control of an automatic machine. A machine-readable card is inserted between preselected documents in the stack. When the transport detects a passage of the card through the transport system, the machine is commanded to perform a specific function. The exemplary machine described herein is a microfilm camera, and the illustrative functions are two side copying and batch or file marking." The approach of using machine-readable card is disadvantageous, however, because it adds cost and complexity to the system.

SUMMARY

Methods and apparatus for producing personalized photo greeting cards are disclosed. In one embodiment, the personalized photo greeting cards are produced in an automated workflow in which the card orders from different users are automatically scheduled, printed, separated and distributed to the intended recipients. The card jobs are separated in batches.

In one aspect, a method for producing personalized greeting cards includes a) receiving a plurality of greeting card orders from users; b) separating the ordered greeting card orders into batches; c) producing the ordered greeting cards, including printing a batch-separation symbol on at least one greeting card in each batch; and d) separating the produced greeting cards into batches using the batch-separation symbols.

In another aspect, a method for producing a greeting card to be sent in an envelope to a recipient, includes a) receiving a plurality of one or more greeting card orders having one or more specified recipients from users; b) producing at least one greeting card in the greeting card order; d) printing card matching information and address information on anthe envelope; and e) matching athe greeting card with the corresponding envelop envelope according to the card-matching information printed on the envelope.

In yet another aspect, a method for producing personalized photo product includes a) receiving digital images from users; b) receiving orders of personalized photo product from the users; c) separating the ordered personalized photo product orders into batches; d) producing the ordered personalized photo product, including printing a batch-separation symbol on at least one personalized photo product in each batch; and e) separating the produced personalized photo product into batches using the batch-separation symbols.

In a further aspect, a system for producing personalized photo greeting cards, include a) a server for receiving digital images from a user; b) a computer terminal in remote connection with the server for the user to send the digital images and the order information to the server, each order including at least one personalized photo greeting card having one or more digital image provided by the user; and c) a printing and finishing facility for producing the ordered personalized photo greeting cards in batches, including printing batch-separation symbols on at least one personalized photo greeting card in each batch, separating the produced personalized photo greeting cards into batches using the batch-separation symbols, and shipping the personalized photo greeting cards to user-specified recipient.

In another aspect, the batch separation is marked on the greeting cards by machine-detection symbols and visual symbols for operators' examination. The batch separation symbols are specific to the first and the last greeting card in a batch, and for the greeting card in a single-card batch. Error detection scheme is built in to prevent erroneous merging and splitting of the batches.

In another aspect, a header card is printed and inserted before each card batch. The header card can include machine-readable and visual information about the batch. The header card can also carry information for product promotion. For example, the header card can be a sample card to illustrate a new card design.

The greeting cards are properly matched to the envelopes that hold the corresponding the greeting cards based on the visual and machine-readable symbols are printed on both the greeting cards and the corresponding envelopes. The correct matching between the envelopes and the greeting cards are verified before the card is inserted into the envelope and envelope is sealed.

An advantage of the present invention is that it is compatible with both machine detection and visual verification of the batches.

Another advantage of the present invention is that the batch separation is implemented without extra material cost and throughput penalty.

Yet another advantage of the invention is that it significantly reduces the errors in mismatching print orders with recipients as well mismatching of the greeting cards and the mailing envelopes.

A further advantage of the present invention is that the card batches can be separated by header cards that be used for product promotions for other users or potential users, or for the recipients of the associated card batch. In the latter case, the promotion information can be customized or personalized product promotions. The header cards serves the purpose of batch separation, but are also used for product promotion. The cost of material, labor and equipment are therefore minimized.

The details of one or more embodiments are set forth in the accompanying drawings and in the description below. Other features, objects, and advantages of the invention will become apparent from the description and drawings, and from the claims.

DETAILED DESCRIPTION

Figure 1:
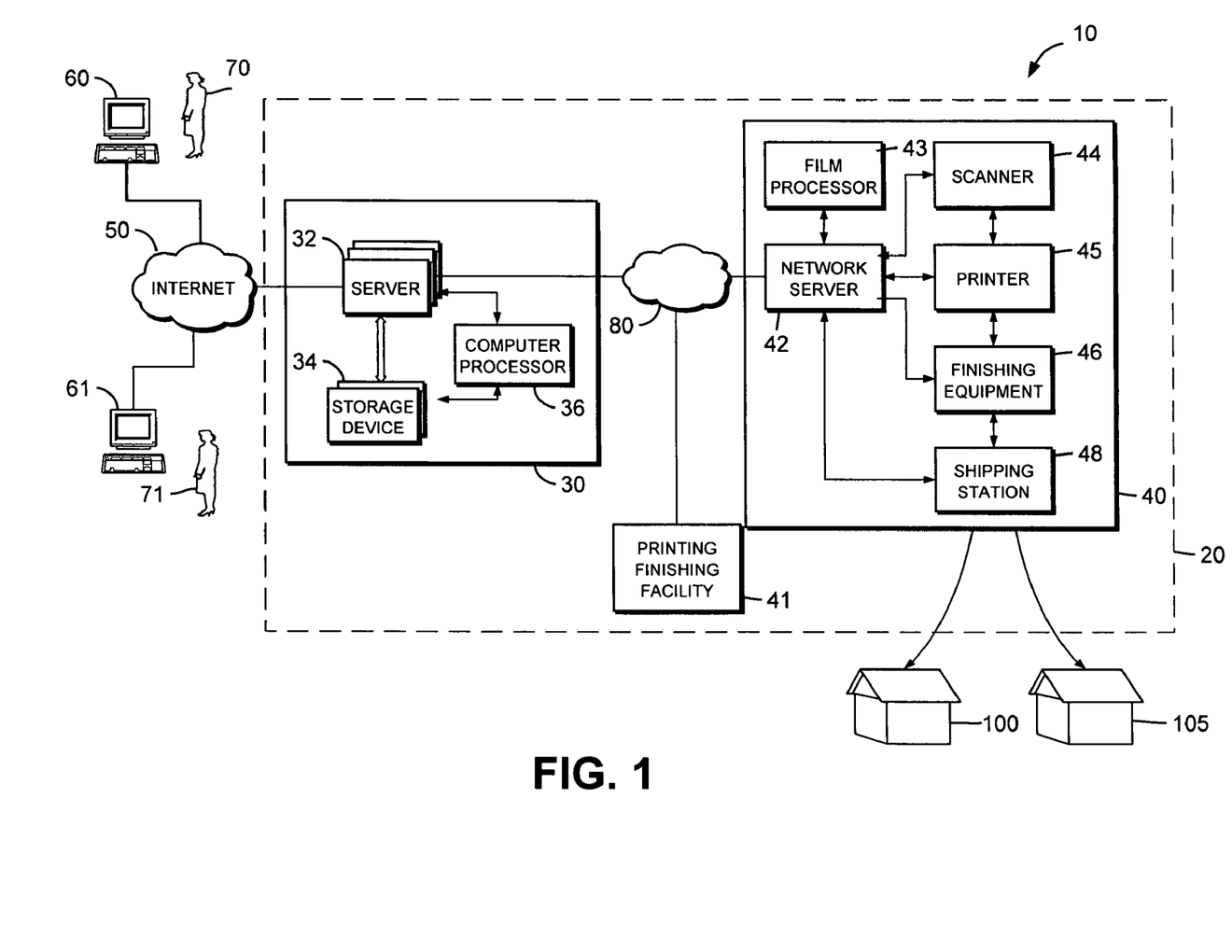
FIG. 1 is a block diagram of a system for producing personalized photo greeting cards in accordance with the present invention.

FIG. 1 shows a block diagram of the system 10 for producing personalized photo greeting cards in accordance with the present invention. An online photo system 20 is established by a photo service provider to provide photo services on a wide area network such as the Internet 50. The online photo system 20 includes a data center 30 and one or more printing and finishing facilities 40 and 41.

The data center 30 includes one or more servers 32, data storage devices 34 for storing image data, user account and order information, and one or more computer processors 36 for processing orders and rendering digital images. An online-photo website is powered by the servers 32 to serve as a web interface between the users 70 and the photo service provider. The users can order photo products from the web interface. The printing and finishing facilities 40,41 produces the ordered photo products such as photographic prints, greeting cards, photo albums, photo calendars, photo books, photo T-shirt, photo mugs, record images on compact disks (CDs), and framed photo prints. In accordance with the resent invention, the greeting cards include folded greeting cards, postcards, trading cards such as baseball cards or game cards, and other form of cards. The users 70 can personalize their greeting cards by including an image uploaded from the website.

The architecture of the data storage devices 34 is designed to optimize the data accessibility, the storage reliability and the cost. Further details on the image data storage in online photo system 20 are provided in the commonly assigned and above referenced U.S. patent application Ser. No. 09/428, 871 filed Oct. 27, 1999, titled "Multi-Tier Data Storage System", which is incorporated herein by reference.

The printing and finishing facilities 40,41 can be co-located at the data center 30. Alternatively, the printing and finishing facility 40,41 can be located remotely from the data center 30. Multiple printing and finishing facilities 40,41 can be set up so that each printing and finishing facility 40,41 can be located geographically close to a large population of customers to shorten order delivery time. Furthermore, the printing and finishing facilities 40,41 and the data center 30 can be owned and operated by different business entities. For example, the data center 30 can be owned by a first business entity that hosts a website that provides a web front and web user interface for the user 70. The printing and finishing facilities 40,41 can be owned by a second business entity that fulfills the photo product orders that are received from the data center 30. In this particular arrangement, the second business entity is often referred as an Application Service Provider (ASP). The photo service provider can provide services to its customers from its own website, as well as fulfill (i.e. ASP) photo products for websites hosted by other business entities.

Figure 4:
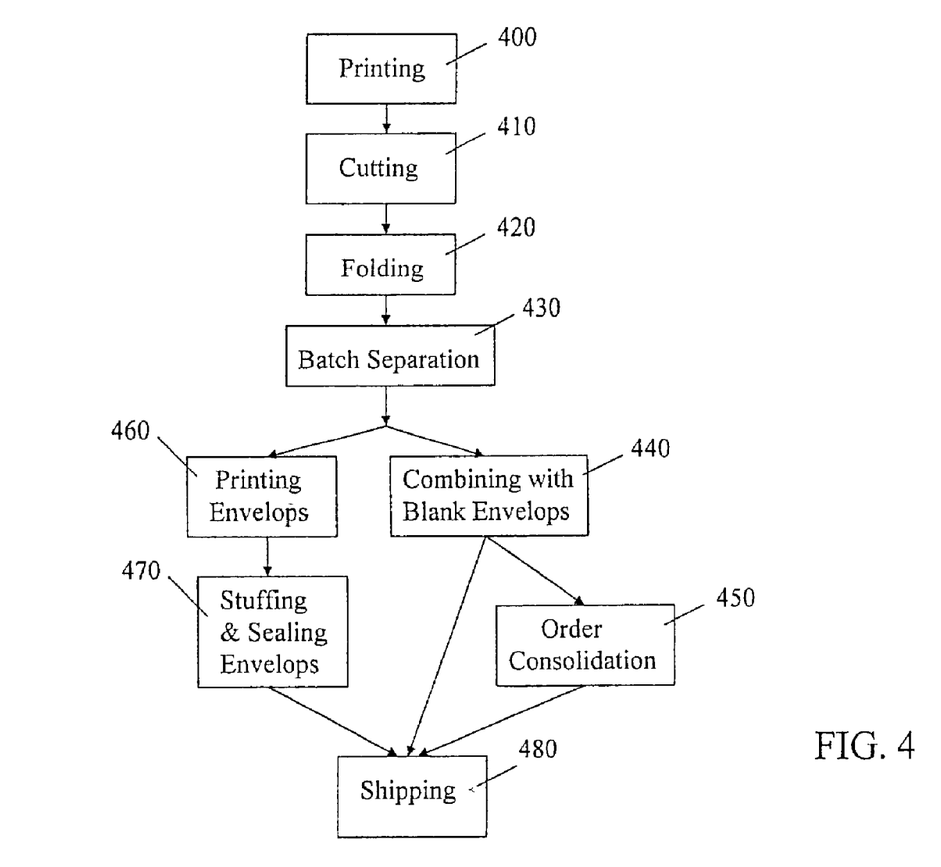
FIG. 4 is a diagram illustrating a workflow for making folded greeting cards.

The printing and finishing facility 40 includes network servers 42 for communicating with the data center 30, printers 45 for printing images on physical surfaces, finishing equipment 46 for operations after the images are printed, and shipping stations 48 for confirming the completion of the orders and shipping the ordered photo products to recipients 100 and 105 (the user 70 can be a recipient). The printers 45 are digital printers that takes digital data input and produces images on a receiver. Examples of printer 45 include can be digital photographic printers such as Fuji Frontier Minilab printers, Kodak DLS minilab printers, Gretag CYRA FastPrint digital photo printer, or Kodak I-Lab photo printers. The printers 45 can also include offset digital printers or digital printing presses such as HP Indigo UltraStream 2000 digital printing press, Xerox's DocuColor printers etc. The printers 45 can also include large format photo or inkjet printers for printing posters and banners. The printing and finishing facilities 40,41 can include a film processor 43 for processing exposed films, and a scanner 44 for digitizing a processed film stripe. The network servers 42 are connected with the data center 30 via a computer network 80 such as a Local Area Network or a Wide Area Network. The order information and image data can be transferred from servers 32 to the network servers 42 using a standard or a proprietary protocol (FTP, HTTP, among others). The finishing equipment 46 can perform any operations for finishing a complete photo product other than photo printing such as cutting, folding, adding a cover to photo book, punching, stapling, gluing, binding, envelope printing and sealing, packaging, labeling, weighing and postage metering. The finishing operations can also include framing a photo print, recording image data on a CD-ROM, etc. Furthermore, the printers and the finishing equipments can be located in different sites. Some finishing operations can be fulfilled by an external contractor. More detailed workflow for producing folded greeting cards is illustrated in FIG. 4.

Figure 2:
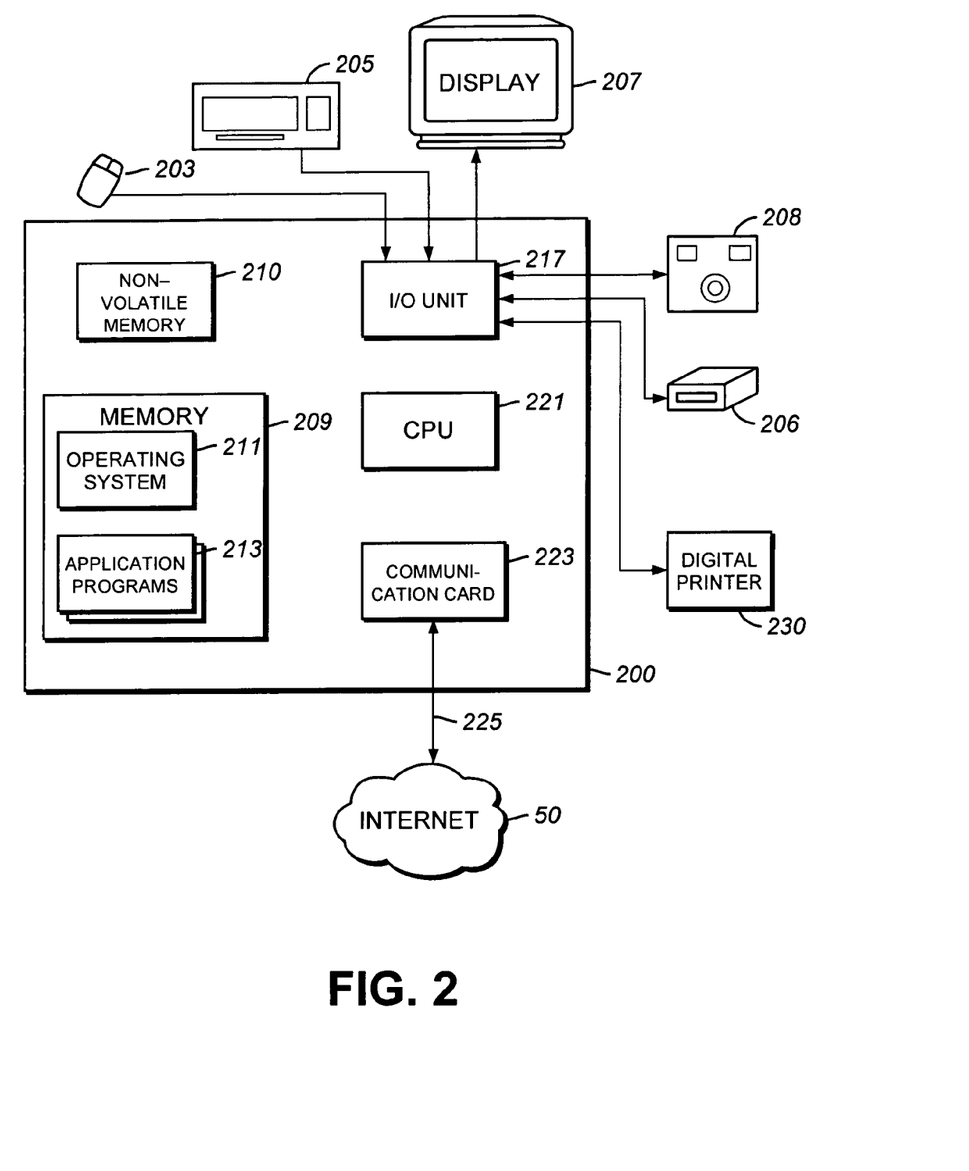
FIG. 2 shows a typical computer that a customer uses for receiving digital image data from a digital image capture device and for accessing a photo hosting website on the Internet.

A user 70 can access the online-photo website using a computer terminal 60 as shown in FIG. 2. The computer terminal 60 can be a personal computer located at a home or at a business, or a public entry terminal such as a kiosk. The computer terminal 60 allows a user 70 to execute software to perform tasks such as communicating with other computer users, accessing various computer resources, and viewing, creating, or otherwise manipulating electronic content, that is, any combination of text, images, movies, music or other sounds, animations, 3D virtual worlds, and links to other objects. Exemplary components of the computer terminal 60, shown in FIG. 2, include input/output (I/O) devices (mouse 203, keyboard 205, display 207) and a general purpose computer 200 having a central processor unit (CPU) 221, an I/O unit 217 and a memory 209 that stores data and various programs such as an operating system 211, and one or more application programs 213 including applications for viewing, managing, and editing digital images (e.g., a graphics program such as Adobe Photoshop). The computer 200 also includes non-volatile memory 210 (e.g., flash RAM, a hard disk drive, and/or a floppy disk, CD-ROM, or other removable storage media) and a communications device 223 (e.g., a modem or network adapter) for exchanging data with an Internet 50 via a communications link 225 (e.g., a telephone line).

In accordance with the present invention, the computer 200 allows the user 70 to connect to the online-photo website using the communications card or device 223. The user 70 can set up and access her personal account. The user 70 can enter user account information such as the user's name, address, payment information (credit card number), and information about the recipient of the photo products ordered by the user 70. The user 70 can also enter payment information such as credit card number, the name and address on the credit card etc. The user 70 can also send (i.e. upload) digital image data to the online-photo website. In accordance with the present invention, the user can store the images in an online photo album, create personalized photo greeting card at the web user interface, and order a personal photo greeting card for specified recipients 100 and 105.

The computer 200 of FIG. 2 can also be connected to various peripheral I/O devices such as an image capture device (digital camera, film scanner or reflective scanners). One such peripheral device is a digital camera 208 that enables users to take pictures and save them in digital (electronic) format. Typically, the digital camera 208 is connected to the computer 200 only while the user is transferring images to the computer's disk drive or other non-volatile memory 210. The digital camera 208 can be connected to the computer 200 using a Firewire or an USB port, from a camera cradle (e.g. Kodak DX3900 using an EasyShare camera Dock), or over wireless media such as radio or optical medium. The digital images captured by a digital camera are typically stored in memory card (e.g., SmartMedia™ or CompactFlash™) that are detachable from the digital camera. The digital images on a memory card can be transferred to the computer 200 using a card reader 206 and saved on non-volatile memory 210.

The user 70 can also obtain digital images from film-based prints from a traditional camera by sending an exposed film into a photo-finishing service, which develops the film to make prints and/or scans (or otherwise digitizes) the prints or negatives to generate digital image files. The digital image files then can be downloaded by the user or transmitted back to, the user by e-mail or on a CD-ROM, diskette, or other removable storage medium. The users can also digitize images from a negative film using a film scanner that is connected to the computer 200 or from a reflective image print using a scanner. Digital images can also be created or edited using an application program 213 (e.g., a graphics program such as Adobe Photoshop).

Once the digital images are stored on the computer 200, a user can perform various operations on them using application programs 213 stored in memory 209. For example, an image viewer application can be used for viewing the images and a photo editor application can be used for touching up and modifying the images. In addition, an electronic messaging (e.g., e-mail) application can be used to transmit the digital images to other users. In accordance with the present invention, one of the application programs 213 can enable the user 210 creating a personalized photo greeting card on the computer 200. Several of the above described imaging functions can be incorporated in one imaging software, which can be provided by the photo service provider and installed on computer 200 for the user 70. More details about application programs 213 for image enhancement and image management.

In addition to viewing the digital images on the computer display 207, the user 70 may desire to have physical photo products made of digital images. Photo prints can be generated by the user 70 using a digital printer 230 that is connected to the computer 200. Typical digital printers 230 can include such as an inkjet printer or a dye sublimation printer. The user 70 can also purchase photo products from the online photo service provider. In accordance with embodiments of the present invention, examples of such photo products may include personalized photo greeting cards, photo prints based on silver halide photographic paper (versus ink jet receiver used by ink jet printers), personalized photo greeting cards, photo books and albums, photo T-shirt, and photo, mugs etc. The personalized photo greeting cards include users' photos and personalized text. The production of these photo products often require the use of commercial equipment which are usually only available at a commercial production location such as the printing and finishing facilities 40 and 41. One online photo service provider that makes such photo products is Shutterfly, Inc., located at Redwood City, Calif., U.S.A.

In accordance with the present invention, the user 70 can be a consumer that accesses the computer terminal 60 from home or a public entry terminal. The user 70 can also be a business owner or employee that may access the computer terminal 60 at a retail location such as a photo shop or a printing store. In the latter case, the digital images may be generated by a customer of the business and later provided the business for receiving an imaging service. An advantage of the present invention, as described above, is that it allows the business to provide photo products that are otherwise unavailable at the business location. For example, the production of personalized photo greeting cards require commercial printing press and finishing equipment that are not typically available at retail business locations. The formats of communication between the computer terminal 60 and the servers 32 as well as the graphic user interface (as described below relating to FIGS. 3 through 7) can be customized for the consumer and commercial customers.

The computer terminal 60 can also be a public entry terminal such as a kiosk for receiving digital image data from the user 70 and uploading the digital images to the server 32. After the digital image files have been uploaded, the user can view, manipulate and/or order prints in the manners described above. The public entry terminal can also support various electronic payment and authorization mechanisms, for example, a credit or debit card reader in communication with a payment authorization center, to enable users to be charged, and pay for, their prints at the time of ordering.

A typical process of using an online photo service is now described. The user 70 sends digital images to the servers 32 provided by the online photo system 20 by uploading over the Internet 50 using a standard or a proprietary protocol (FTP, HTTP, XML, for example) or electronic communication application (for example, e-mail or special-purpose software provided by the photo-finisher). The user 70 can also send digital image data stored on a physical storage medium such as a memory card or recordable CD by US mail, overnight courier or local delivery service. The photo-finisher can then read the images from the storage medium and return it to the user, potentially in the same package as the user's print order. In addition, the photo service provider can load data or programs for the user's benefit onto the storage medium before returning it to the user. For example, the photo-finisher can load the storage medium with an application program 213 for the user to create a personalized photo greeting card on his computer 200.

The user 70 can also send a roll of exposed film, and processed film negatives to the photo service provider. The exposed film is processed by the film processor 43 and digitized by the scanner 44 in the printing and finishing facilities 40,41. The digital image data output from the scanner 44 is stored on the data storage 34.

After the photo service provider has received the user's digital images, the photo service provider can host the images on the online photo website, at which the user can view and access the images using a browser application. The user 70 accesses the online-photo website to designate which of the images should be reproduced on a photo product, parameters relating to printing (e.g., finish, size, number of copies), and one or more recipients 100, 105 to whom the photo products are to be sent.

In addition to hosting the user's images on a web page, the photo service provider usually stores the images in an image archive on in the data storage 34 so that the user 60 and others given authorization by the user (e.g. the share recipient 110) can access them in the future. The photo service provider can also provide sample images for the users to select for use online or producing a physical photo product.

After the user's images have reached the photo service provider and have been made available online, the user can place an order with the photo service provider. One way to place an order is by having the user 70 view the images online, for example, with a browser and selectively designate which images should be printed. The user can also specify one or more recipients 100,105 to whom prints should be distributed and, further, print parameters for each of the individual recipients, for example, not only parameters such as the size, number of copies and print finish, but potentially also custom messages to be printed on the back or front of a print.

The information stored in the data storage 34 is provided to a printing and finishing facilities 40,41 for making the photo products. The photo products include photographic prints, but also any other item to which graphical information can be imparted, for example, greeting or holiday cards, books, greeting cards, playing cards, T-shirts, coffee mugs, mouse pads, key-chains, or any other type of gift or novelty item. The photo products are printed by the printer 45 and finished by finishing equipment 46 according to the printing parameters as specified by the user 70. The photo products are then delivered to the specified recipients 100, 105 using standard U.S. Mail, or courier services such as Federal Express or UPS.

Further details on the generation and distribution of photo products using online photo system 20 are provided in the commonly assigned and above referenced U.S. patent application Ser. No. 09/436,704, filed on Nov. 9, 1999, titled "Distributing Images to Multiple Recipients", by Baum and U.S. patent application Ser. No. 09/450,075, filed on Oct. 27, 1999, titled "Printing Images in an Optimized Manner", by Baum, et al. The disclosures of these patent applications are herein incorporated by reference.

Figure 3:
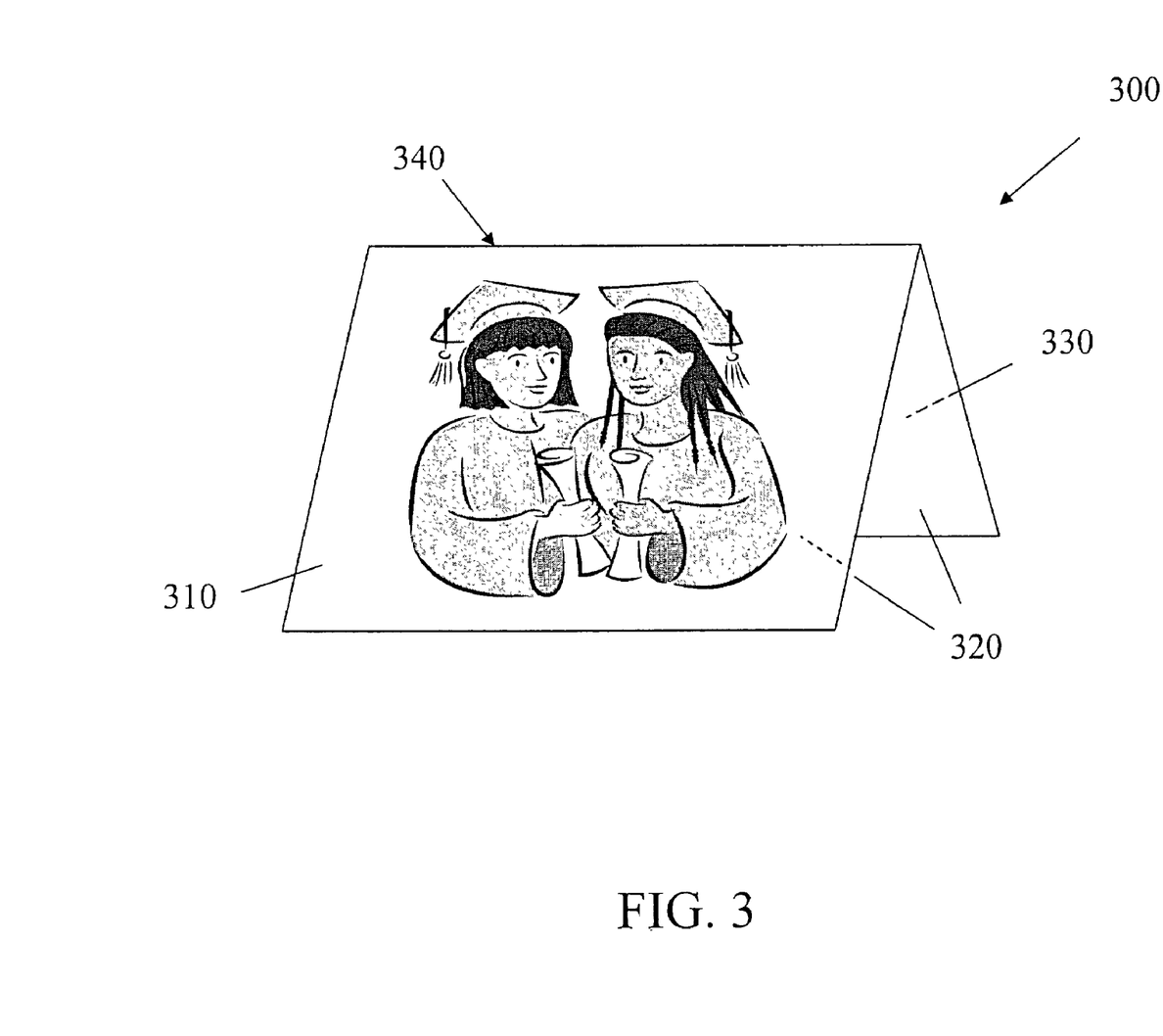
FIG. 3 is a perspective view of a folded greeting card including four faces.

FIG. 3 illustrates a perspective of a folded greeting card 300, including a cover face 310, internal faces 320, and a back face 330. The two flaps containing the cover face 310 and the back face 330 are separated by a central fold 340. The greeting card are typically in the dimensions of 5" by 7" or 4" by 6", after folding. The cover face 310 includes an image selected from the user 70's photo album on the web. A border or annotations can be added to the image on the cover face 310. The incorporation of a user's personal images from his or her photo album at the website into a personalized greeting cards is similar to the creation of personalized photo calendars that is described in the above mentioned U.S. patent application Ser. No. 10/106,902, filed on Mar. 25, 2002, titled "Producing and sharing personalized photo calendars", by Weitzman et al. The disclosure of this related application is incorporated herein by reference.

The internal faces 320 of the folded greeting card 300 include personalized greeting messages. The personalized message are input or selected by the user 70 at the user interface, at the web site provided the online photo system 20.

The personalized photo greeting card designed by the user 70 can be previewed and edited at the web user interface. The preview can be shown in two-dimensional layout or in perspective views. The greeting cards completed can be saved as a project for the user 70 to reuse to save time in the future. Details of previewing and editing are disclosed U.S. patent application Ser. No. 09/721,484, filed on Nov. 22, 2000, titled "User Interface and Methods for On-line Print Service", by Manolis, et al., U.S. patent application Ser. No. 09/450,804, filed on Nov. 29, 1999, titled "Image Uploading", by Manolis, et al., U.S. patent application Ser. No. 09/560,609, filed on Apr. 28, 2000, titled "System and Method of Providing a User Interface for Changing Attributes of an Image-based Product", by Haeberli, and U.S. patent application Ser. No. 09/684,595, filed on Oct. 5, 2000, titled "Previewing a framed image print", by Haeberli. The disclosure of these related application is incorporated herein by reference.

FIG. 4 is a diagram illustrating, the operation steps of producing folded greeting cards. The orders from the users 70 are scheduled as printing jobs for production at the printing and finishing facilities 40,41. In an automated workflow, the greeting cards ordered by different users 70 are continuously printed at the printer 45. The continuous printing mode minimizes the down time of the printer and maximizes the usage of the printers. The efficient use of the printers 45 will lower the equipment cost as well labor cost per greeting card.

The image data sent to the printer 45 include images corresponding to the cover face 310, back face 330, and internal faces 320 of the folded greeting card 300, which will be distributed on the receiver in a predefined layout (box 400). The receivers are preferably cardstock paper, and can be input to the printer in sheet or web form. The card images are typically printed on the both sides of the receiver corresponding to the outer and internal faces of the folded cards (FIG. 3). When the receiver is fed in sheet form, one or more greeting cards can be printed on each sheet. For example, the sheet can be in dimensions of 12"×18" wherein two greeting cards are printed double sided in two 10"×7" image areas.

As the greeting cards are continuously produced, it is necessary to be able to separate the greeting cards after the greeting cards are produced so the correct greeting cards are sent to the intended recipients. For this purpose, the greeting cards to be printed are separated in batches. The batches may be defined so that different batches correspond to different recipient so that the greeting cards can be separated in batches (box 430) and packaged and sent to the same recipient. The batches can also be defined based on the capacity of the containers. For example, if a container for packaging cards can hold 50 greeting cards, the batch size can be defined as 50 cards. If a recipient receives 100 greeting cards, the package will include two containers, each having 50 greeting cards.

Figure 5:
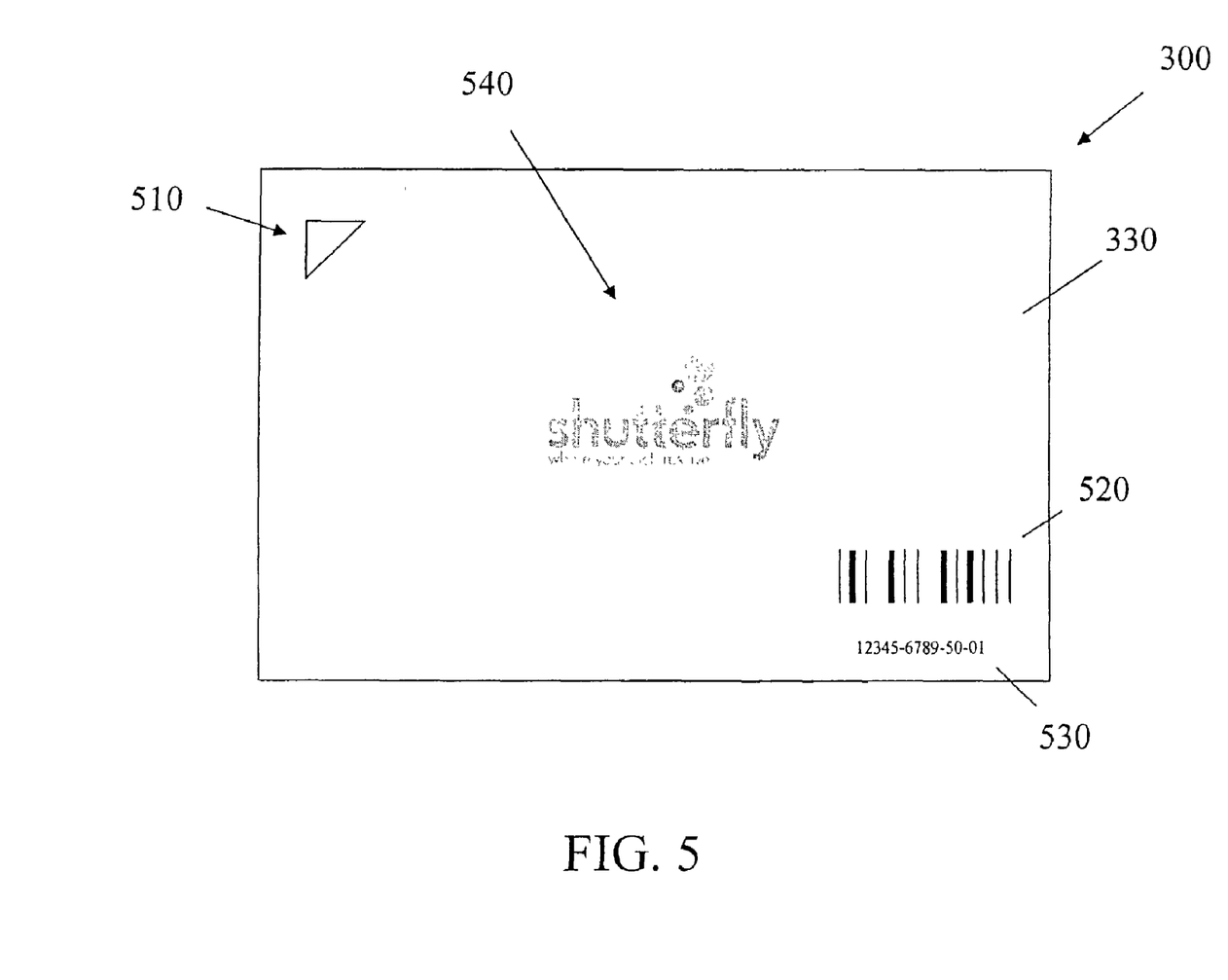
FIG. 5 shows an exemplary layout of the back face of the folded greeting card in accordance with the present invention.

In accordance with the present invention, the separation of the order batches is facilitated using batch-separation symbols. FIG. 5 shows an exemplified layout of the back face 330 of the folded greeting card 300 in accordance with the present invention. The back face 330 includes a visual symbol 510, a machine-readable symbol 520, a serial number 530, and a corporate logo 540. The specific designs of the symbols can be optimized in pattern, color, and size so that they can merge into the overall look of the cards. The greeting cards are sorted in a pre-determined sequence in each batch as defined by a unique alpha-numeric character corresponding to each specific card. For example, in FIG. 5, the Ser. No. "12345-6789-50-01" includes several number strings: "12345" denotes the order number from a customer who ordered the cards, and "6789" the batch number. The order number is printed on the greeting card 300 for assisting the customer to refer back to the card order in the future. "50" defines the number of greeting cards in the specific batch. The last digits in the serial number 530 define the sequence number of the greeting card within the batch. For example, "01" denotes the first card in the batch. The 20$^{th}$ card in the batch of 50 greeting cards thus has a suffix number '20'. It is understood that the specific scheme for defines the serial number may vary within the scope of the present invention.

Figure 6A:
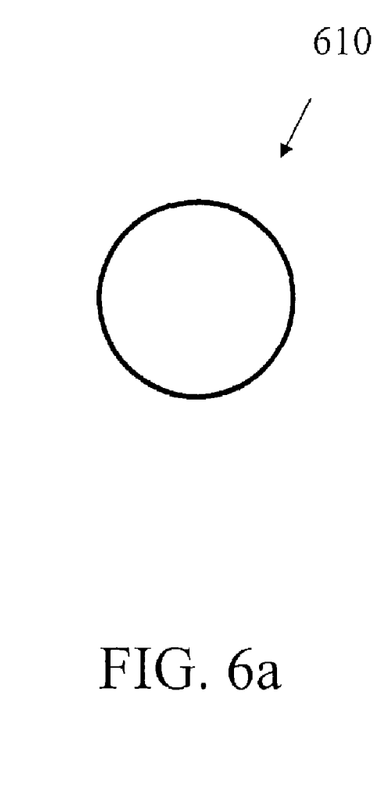
FIG. 6a shows an example of a visual symbol for the first photo greeting card in a batch of two or more cards.
Figure 6B:
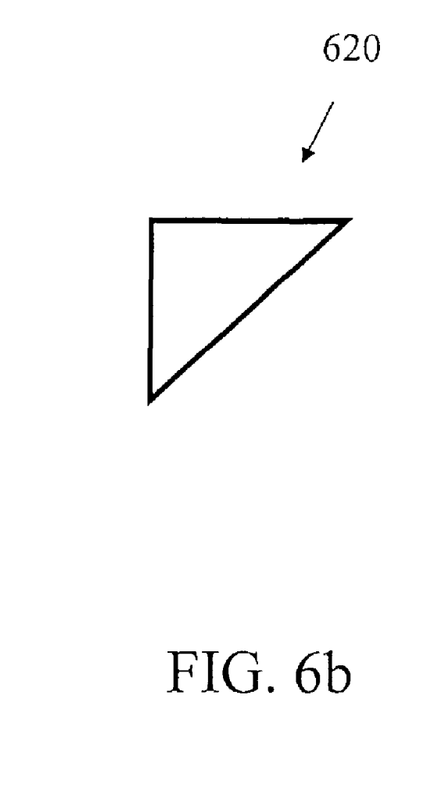
FIG. 6b shows another example of the visual symbol for the last photo greeting card in a batch of two or more cards.
Figure 6C:
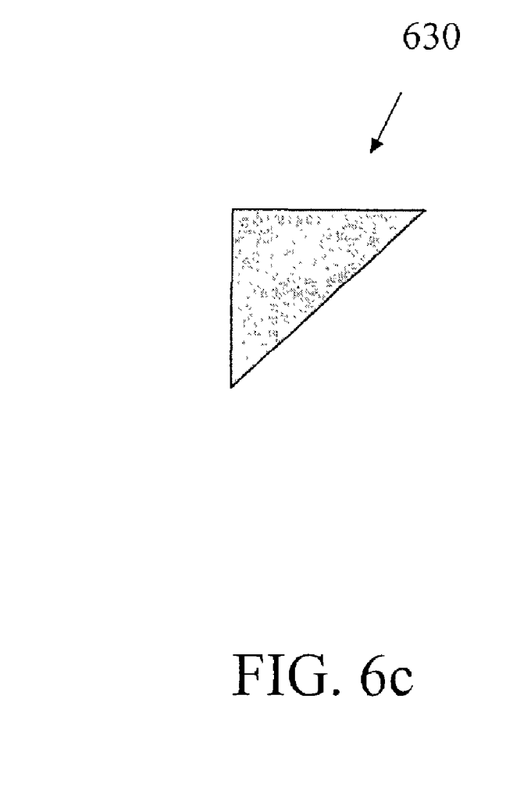
FIG. 6c shows another example of the visual symbol for the photo greeting card in a batch of a single card.

The visual symbols 510 are used for the visual examination by the operators (box 430). Different visual symbols can be marked on the first and the last card in a batch. For example, the first card visual symbol 610 and the last card visual symbol 620 are respectively shown in FIGS. 6a and 6b. If a batch contains only a single greeting card, a different visual symbol 630 (shown in FIG. 6c) can be used to properly distinguish it from other card batches. The visual symbols as illustrated in FIGS. 6a-6c can be crosschecked with the serial numbers 530 as discussed above. In addition, as described below in relation to box 430, the machine-readable symbols can also be decoded by a machine and cross verified against the visual symbol 510 and the serial number 530.

Returning to FIG. 4, the image areas printed with the greeting card information are next cut into pieces each containing one individual greeting card (box 410). A stack of receiver sheets can be cut by a guillotine cutter to produce stacks of 10"×7" receiver pieces each containing one greeting card. Guillotine cutters are available from a number of firms such as Baumfolder, located at Sidney, Ohio, and Challenge at Grand Haven, Minn. The cutting can also be conducted using slit cutters, box cutters, available from Rollem Corporaion of America, located Hempstead, N.Y., etc.

Next the receiver pieces containing individual greeting cards are folded into 5" by 7" folded greeting cards 300 (box 420). Common commercial folders are available from MBO America, located at Westampton, N.J., Baumfolder, GBR System Corporation, and Rollem Corporaion of America. Typical folding operations on a thick card stock receiver include first scoring the receiver piece along the fold line along a first direction, and second folding at the fold line to produce the fold 340 by moving the receiver along a second direction at the right angle to the first direction.

The folded greeting cards 300 are separated in batches (box 430) after the cards are folded. The batch separation can be conducted with the assistance of one or a combination of the visual symbol 510, the machine-readable symbol 520, and the serial number 530. In one exemplified process, the machine-readable symbols are printed in barcode. An operator picks up a first card in a batch as indicated by the first card visual symbol 610 and scans the machine readable code 520 using a bar-code scanner that is connected to a computer. The bar code is decoded and the information about this particular card batch is extracted from a database. The operator then flips across the folded cards and find the last card in the batch as indicated by the last card visual symbol 620. The operator uses the bar-code scanner of the machine-readable symbol on the last greeting card. The information extracted from the second barcode scan will be compared to the information from the first scan. If the two scans confirm the matched batch number and the first and the last cards within the batch, the computer will generate a pass signal in visual or audio form. If no matching is found, an error signal will be produced by the computer and the operator will be alerted to physically check batch separation of the folded greeting cards.

A unique visual symbol 630 is marked on the back face of the greeting card if it is the single card in the batch. A special symbol is used because this card is both the first and the last card in the batch. To verify the batch information, the operator scans the machine-readable symbol 520 twice to close the check loop on the whole batch.

Another task at the batch separation 430 is to sort the card order according to the shipment types. The common card orders include the boxed cards and direct-mail cards. The boxed cards are ordered and shipped back the same user 70. For example, if a user likes to put some handwriting messages on her Christmas Cards or Holiday Cards, she orders the cards as boxed cards, writes messages, and mails the cards out to the recipients by herself The direct-mail cards ordered by a user 70 are to be mailed by the photo service provider directly to the recipients. The user inputs the recipient's address, her address as the sender's address, and selects a stamp type for the direct-mail cards. This saves the user from spending additional time on the greeting card.

In accordance with the present invention, the colors of the batch-separation symbols (510, 520, 530) can be used to indicate the properties of the card orders. For example, different colors in the batch-separation symbols can represent the shipping type or the packaging type. The orange color indicates boxed cards for UPS next-day shipping and a light green for direct-mail cards. Using the color codes, the operator can direct-mail cards and the boxed cards. The boxed-card batches are sent to combine with the correct number of blank envelops (440), and packed in a container. The number of the blank envelops needed for each boxed cards is indicated from the serial number on the back face of the cards or from the signal generated by the computer after scanning the machine-readable code.

In accordance with the present invention, the blank envelopes can be counted in several methods (box 440 of FIG. 4). The blank envelopes can be presorted in groups of fixed numbers (e.g. 10, 25, 50 per group) to aid the manual counting at the step of combining with the blank envelopes (440). Alternatively, after the barcode 520 on a greeting card is scanned and the number envelopes needed for the batch is decoded, the blank envelopes can be weighed by a digital scale to match the correct number of envelopes. The scanning of the barcode 520 on a greeting card (e.g. the first card in a batch) can also trigger an printer to count out blank envelopes without printing any information on them.

Next, the packaged boxed cards are sent to shipping (480), or to order-consolidation with other photo products (e.g. photo prints, CD's etc.) in the same order (450) and sent to shipping. The shipping label and shipping slip are printed with proper shipping address, order information and a barcode. The products are packaged and postage metered. The completion of the order is confirmed by scanning the shipping barcode at the shipping station (480).

In accordance with the present invention, the separation of the batch of greeting cards can also be achieved by inserting a header greeting card between successive card batches. A header greeting card is not ordered by the user 70, but designed and printed as part of the workflow. The header cards can include marketing and product promotion information such as a sample of a new card design for birthday party or Mother's Day. Alternatively, the header cards can be orders from a different order containing a plurality cards with static content. Once the card batches are properly separated in box 430 (FIG. 4), the header cards can be placed in a separate container to be shipped to the intended customers or promotion audience.

The header cards can be printed and sent to the recipients 100,105 together with the cards in the same card batch. The header cards can include product promotional information specifically customized to the recipient that will be receiving the greeting cards in the card batch. For example, if the recipient is known to be a film camera user, promotion information can include sales information on film mailers for the recipient to send in exposed film rolls to the photo service provider for film development and digitization of the exposed images. The product promotion information can also include images or a new product such as a photobook (e.g, Snapbook available at "www.Shutterfly.com" website) or URL links where promotion information can be found. The leader cards that are customized or personalized for the recipients will be sent to the recipients in their respective card orders.

Figure 7:
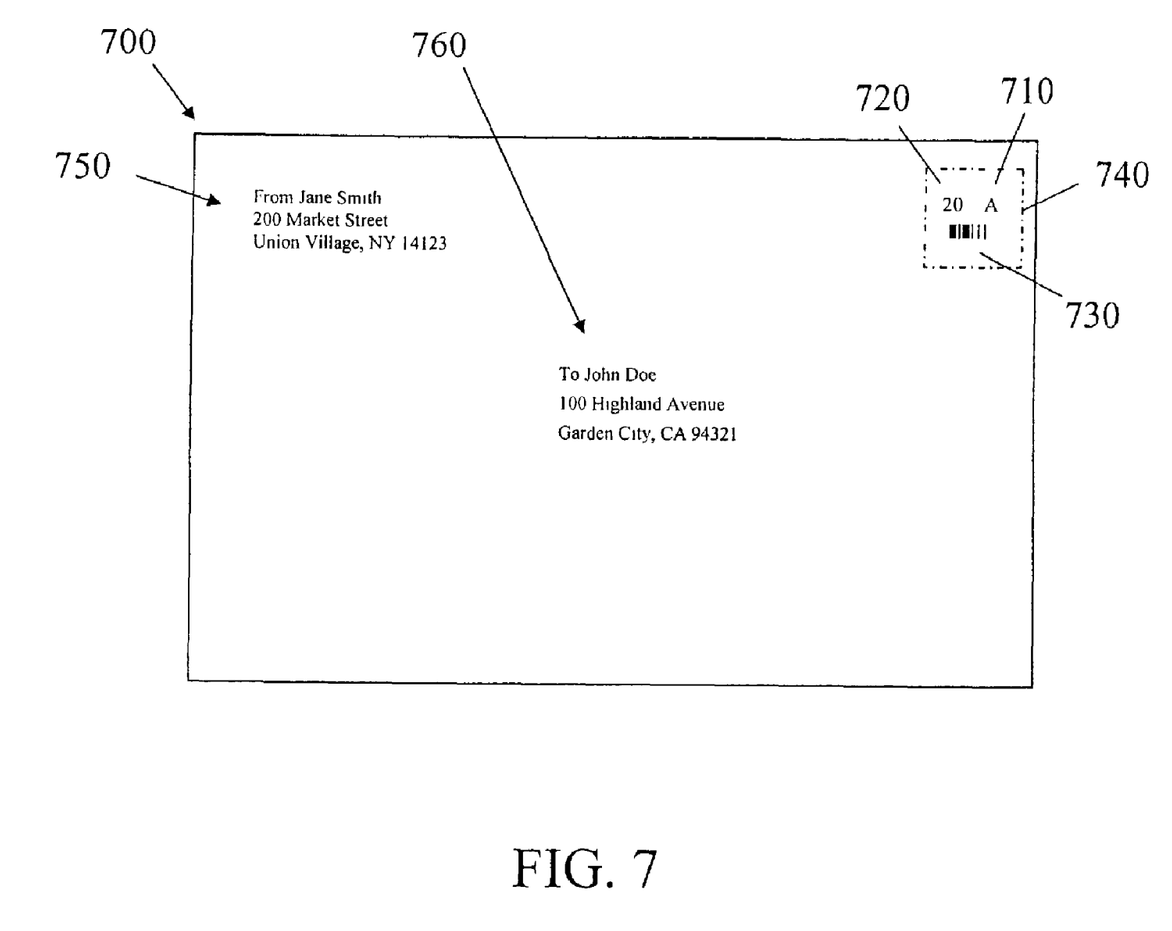
FIG. 7 illustrates a card envelope that is printed with symbols for matching with the corresponding greeting card.

After the direct-mail cards are scanned by the barcode scanner (box 430) for batch separation, the envelopes are printed for the whole batch (box 460). As shown in FIG. 7, the printed information on the envelope 700 includes the sender address 750 and recipients' address 760, as well as a stamp code 710, a serial number 720, and a bar code 740 under a stamp area 740. The stamp symbol aids the operator to select a stamp for each envelope. The serial number 720 matches the last two digital of the serial number 530 so that the direct-mail card and the corresponding envelopes can be matched. The greeting cards are respectively inserted into each envelope and the envelope is sealed (470). The correct stamp type is selected according to the stamp code 710. The stamp is affixed over the stamp area 740 to fully cover the stamp code 710, the serial number 720, and the bar code 740 from the recipient's view. The barcode 740 of at least one envelope in a direct-mail batch is scanned to confirm the completion of the direct-mail order batch before they are shipped (480). The barcode 740 can also include information about the matching greeting card so that the scanning of the barcode 740 and the scanning of the machine-readable code 520 will confirm the correct matching of the envelope 700 and the corresponding greeting card.

In accordance with the present invention, a batch of greeting cards together with the corresponding envelops with printed address and card-matching information can be shipped in a single package to a recipient (typically the user who submitted the card order). Each card can be inserted into the corresponding envelope or tugged in the flap of the corresponding envelope. The envelope is typically not sealed to allow the recipient to write personal message on the cards. In general, the boxed cards, the direct-mail cards, and other photo products can all be consolidated into one package, if they are to be shipped to the same recipient.

Various implementations of the systems and techniques described here may be realized in digital electronic circuitry, or in computer hardware, firmware, software, or in combinations thereof. A system or other apparatus that uses one or more of the techniques and methods described here may be implemented as a computer-readable storage medium, configured with a computer program, where the storage medium so configured causes a computer system to operate on input and/or generate output in a specific and predefined manner. Such a computer system may include one or more programmable processors that receive data and instructions from, and transmit data and instructions to, a data storage system, and suitable input and output devices. Each computer program may be implemented in a high-level procedural or object-oriented programming language, or in assembly or machine language if desired; and in any case, the language may be a compiled or interpreted language. Suitable processors include, by way of example, both general and special purpose microprocessors.

A number of embodiments have been described. Nevertheless, it will be understood that various modifications may be made without departing from the spirit and scope of the invention. For example, advantageous results still could be achieved if steps of the disclosed techniques were performed in a different order and/or if components in the disclosed systems were combined in a different manner and/or replaced or supplemented by other components. Accordingly, other embodiments are within the scope of the following claims.

ELEMENT NUMBER LIST 10 system for producing personalized photo greeting cards
20 online photo system
30 data center
32 server
34 data storage devices 36 computer processor
40 printing and finishing facility
41 printing and finishing facility
42 network server
43 film processor
44 scanner
45 printer
46 finishing equipment
48 shipping station
50 Internet
60 computer terminal
70 user
80 computer network
100 recipient
105 recipient
110 share recipient
200 computer
203 mouse
205 keyboard
206 card reader
207 computer display
208 digital camera
209 memory
210 non-volatile memory
211 operating system
213 application program
217 I/O unit
221 Central Processing Unit (CPU)
223 communication device
225 communications link
230 digital printer
300 folded greeting card
310 front face
320 internal face
330 back face
340 fold
400 printing
410 cutting
420 folding
430 batch separation
440 combining with envelops
450 order consolidation
460 printing envelops
470 stuffing and sealing envelops
480 shipping
510 visual symbol
520 machine-readable code
530 serial number
540 corporate logo
610 first card visual symbol
620 last card visual symbol
630 visual symbol for a single-card batch
700 envelop
710 stamp code
720 serial number
730 barcode
740 stamp area
750 sender address
760 recipient address

What is claimed is:

1. A method for providing greeting cards for one or more recipients, comprising:
    a) receiving one or more orders comprising one or more greeting cards for one or more recipients;
    b) producing two or more greeting cards in accordance with the one or more orders;
    c) separating the one or more greeting cards into two or more batches;
    d) printing card matching information and address information on a blank envelope to produce a printed envelope; and
    e) using the card-matching information on the printed envelope to match the printed envelope with a greeting card in the two or more greeting cards in the two or more batches, wherein the card matching information is printed on the blank envelope in an area configured to receive a stamp or a shipping label that allows the shipment of the printed envelope containing the greeting card that matches the printed envelope.

2. The method of claim 1, further comprising
    f) inserting the greeting card into the matched printed envelope.

3. The method of claim 1, wherein the card matching information on the printed envelope includes an alphanumeric number that matches a corresponding alphanumeric number printed on the greeting card in the one or more greeting cards in the one or more batches.

4. The method of claim 1, wherein the card matching information includes a machine-readable symbol encoded with information for matching the printed envelope with the greeting card in the one or more greeting cards in the one or more batches.

5. The method of claim 1, further including receiving from a user an image configured to be printed on the one or more greeting cards.

6. The method of claim 1, wherein the step of producing the one or more greeting cards comprises printing an image on at least one of the one or more greeting cards.

7. The method of claim 1, wherein the order is submitted by a user at a computer terminal and received by a server remote to the computer terminal.

* * * * *